United States Patent [19]

Kamoda et al.

[11] Patent Number: 5,559,573
[45] Date of Patent: Sep. 24, 1996

[54] SIMPLIFIED CAMERA

[75] Inventors: Takashi Kamoda; Hiromitsu Kaburagi, both of Omiya, Japan

[73] Assignee: Fuji Photo Optical Co. Ltd., Omiya, Japan

[21] Appl. No.: 384,642

[22] Filed: Feb. 6, 1995

[30] Foreign Application Priority Data

Feb. 7, 1994 [JP] Japan .................................. 6-034126
Feb. 7, 1994 [JP] Japan .................................. 6-034127

[51] Int. Cl.$^6$ ................................................ G03B 17/02
[52] U.S. Cl. ................................................ 354/288
[58] Field of Search ................................. 354/266, 288

[56] References Cited

U.S. PATENT DOCUMENTS

| | | |
|---|---|---|
| 5,274,411 | 12/1993 | Kwak . |
| 5,329,330 | 7/1994 | Sakai et al. . |
| 5,339,124 | 8/1994 | Harms . |
| 5,339,127 | 8/1994 | Muramatsu . |
| 5,343,263 | 8/1994 | Takemae et al. . |
| 5,381,200 | 1/1995 | Takagai . |

*Primary Examiner*—David M. Gray
*Attorney, Agent, or Firm*—Ronald R. Snider

[57] ABSTRACT

The present invention provides a simplified camera that can be produced by utilizing simple components retrieved from a lens-mounted film without performing packaging. Nodder axes of a photography button that nods so as to execute release operation are fitted into axis receptor holes bored in front and back cases. The cases are joined together, whereby the photography button is mounted. A back cover of a camera is mounted securely by applying a coupling structure made tip of pin axes and axis receptor holes to a junction between the front and back cases. Furthermore, a charging button that pressures an acting member for operating a charging switch and has off-prevention members is mounted on the front case into which the acting member is integrated. The charging button is secured by a decorative plate. As for a photography window of the front case, a window glass is locked by turning a glass presser until the glass presser is immobilized by fixtures formed on the front case.

6 Claims, 6 Drawing Sheets

FIG. 7
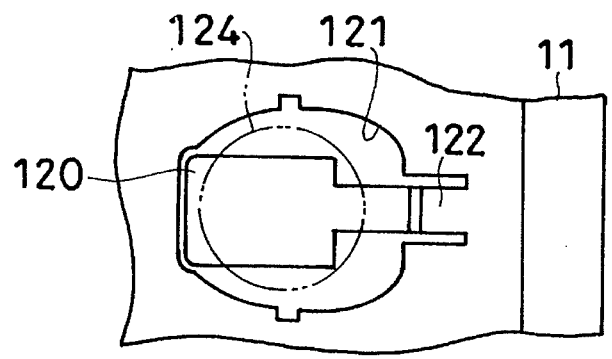
FIG.8(A)　FIG.8(B)
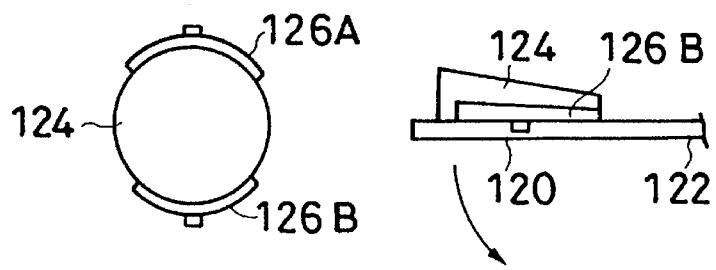
FIG.9(A)　FIG.9 (B)
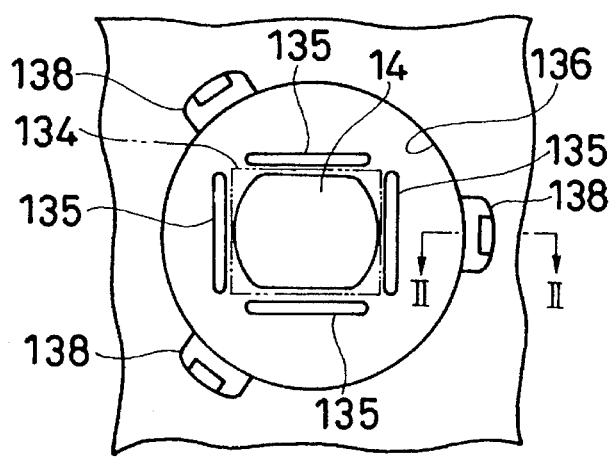
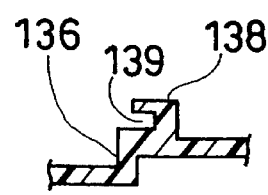

SIMPLIFIED CAMERA

BACKGROUND OF THE INVENTION

This application claims the priority of Japanese Patent Applications Nos. 6-34126 and 6-34127 filed on Feb. 7th, 1994, which are incorporated herein by reference.

1. Field of the Invention

The present invention relates to a case structure adaptable for a film-replaceable camera and characteristic of easy construction of a body case.

2. Description of the Related Art

In the past, lens-mounted films have been widely adopted as disposable cameras. Such a lens-mounted film is readily available and can be handed to a developing agent as it is on completion of photography. The lens-mounted film merely feeds film unidirectionally and solely includes simple components essential to photography. Specifically, a film rewind mechanism is not included and a back cover cannot be opened or closed. Furthermore, the housing and package of the lens-mounted film are strong merely enough to withstand the number of exposures performed on a roll of film. Thus, efforts have been made to realize low manufacturing cost.

FIG. 11 shows a body case for a conventional lens-mounted film. A body case 1 is made of a plastic material. The body case 1 has a viewfinder opening 2, a photographing lens opening 3, and a flash lamp opening 4. A photography button (release button) 5 is formed in the left-hand part of the top of the body case. An acting member 6 for executing shutter release operation is formed under the photography button 5 and integrated with it. The photography button 5 is integrated into the body case 1 via a coupling 7. The photography button 5 nods with the proximal end of the coupling 7 as a supporting point. With the nod, the acting member 6 executes release operation.

A charging button 8 for use in executing charging is integrated into the body case 1 via a coupling 9 and located below the flash lamp opening 4. A charging switch is incorporated in the charging button 8. The body case 1 is entirely packaged in order to intercept external light and keep the appearance unimpaired. The charging button 8 is therefore manipulated through the package material. When the charging button 8 is pressed, it is started to charge a capacitor for strobe flashing. According to this layout, the photography button 5, acting member 6, and charging button 8 are integrated into tile body case 1. The body case 1 is then packaged. The layout is therefore advantageous in that assembling and manufacturing can be achieved effortlessly.

A conventional camera permitting film replacement (or film rewind) is configured completely differently from the foregoing lens-mounted film. The case 1, photography button 5, and charging button 8 have rigid structures that cost relatively high.

If the lens-mounted film can be upgraded in terms of service life and remodeled as a film-replaceable camera, it would prove very useful and offer another value. The present applicant has proposed such an idea that a film-replaceable simplified camera is manufactured at low cost by utilizing a film feed mechanism, a shutter mechanism, a strobe flashing mechanism, and other mechanisms employed in a lens-mounted film.

For the simplified camera, a back cover is designed to be opened. Unlike the lens-mounted film, the case of the simplified camera cannot entirely be packaged. There is difficulty in adopting the structure of the photography button 5 integrated into the body case 1 as shown in FIG. 11. A pivot type photography button must therefore be mounted separately. In this case, mounting should pose no problem. Moreover, the photography button should have the structure resistive to a large number of exposures.

An acting unit for executing charging must be structured without performing packaging from the viewpoint of service life. An acting unit for executing strobe charging may be designed and manufactured as a separate structure. However for cost reduction, it is required to optimize components of a lens-mounted film.

SUMMARY OF THE INVENTION

Accordingly, an object of the present invention is to provide a simplified camera that is produced by readily mounting a pivot type photography button on a film-replaceable camera and helps minimize manufacturing cost.

Another object of the present invention is to provide a simplified camera in which components of a charging unit in a lens-mounted film can be optimized and a charging button can be mounted readily without performing packaging.

For achieving the above objects, a simplified camera of the present invention comprises a support that supports a photography button with which an acting member for executing photography is integrated and that includes pivot axes relative to which the photography button is nodded, and two cases made by dividing a camera case back and forth; that is, front and back cases that have axis receptor holes into which the nodder axes are fitted, and that when joined together, holds the support in such a manner that the photography button can pivot. According to this layout, when the pivot axes are fitted into the axis receptor holes and the front and back cases are joined together, the photography button is mounted readily. When the photography button nods, the acting member executes release operation for a shutter mechanism. Thus, photography is carried out.

It is preferred that the photography button has a flange for restraining it from protruding outward.

When the front and back cases are joined together, pin axes are fitted into axis receptor holes. Thus, a back cover of a camera serving as part of the back case is mounted securely.

A latch member for opening or closing the back cover may be a V-shaped elastic member integrated into the back cover.

Another simplified camera of the present invention comprises an acting member formed on the front case and designed to operate a charging switch, a charging button being positioned so that it pressures the acting member and having off-prevention stoppers formed along the outer circumference of the charging button, and a decorative plate having an opening that is large enough to expose the charging button to outside and to allow the decorative plate to cooperate with the off-prevention stoppers in preventing the charging button from coming off. According to this layout, a nodder type acting member is integrated into a body case in the same manner as it is in a lens-mounted film. A charging button is placed in front of the acting member and a decorative plate is attached. Using the charging button, when the charging button pressures the acting member, an internal charging switch is actuated. At this time, the decorative plate successfully prevents the charging button from coming off.

As for the charging button, it is preferred that one end of the charging button near the acting member and away from a supporting point for nodding should be higher than the other end thereof near the supporting point for nodding.

For constructing a photography window of the front case, partitions are used to position a window glass, and the window glass is locked by turning a glass presser is turned until the glass presser is immobilized by fixtures formed on the front case.

BRIEF DESCRIPTION OF THE DRAWINGS

FIG. 7 shows an acting member for executing charging in a case in FIG. 6;

FIG. 8A is a top view showing a charging button in FIG. 6;

FIG. 8B is a side view showing the charging button in FIG. 6;

FIG. 9A shows a window glass mounting structure in the second embodiment viewed from behind it;

FIG. 9B shows a II—II section of FIG. 9A;

DETAILED DESCRIPTION OF THE PREFERRED EMBODIMENTS

First Embodiment

Figure 1:
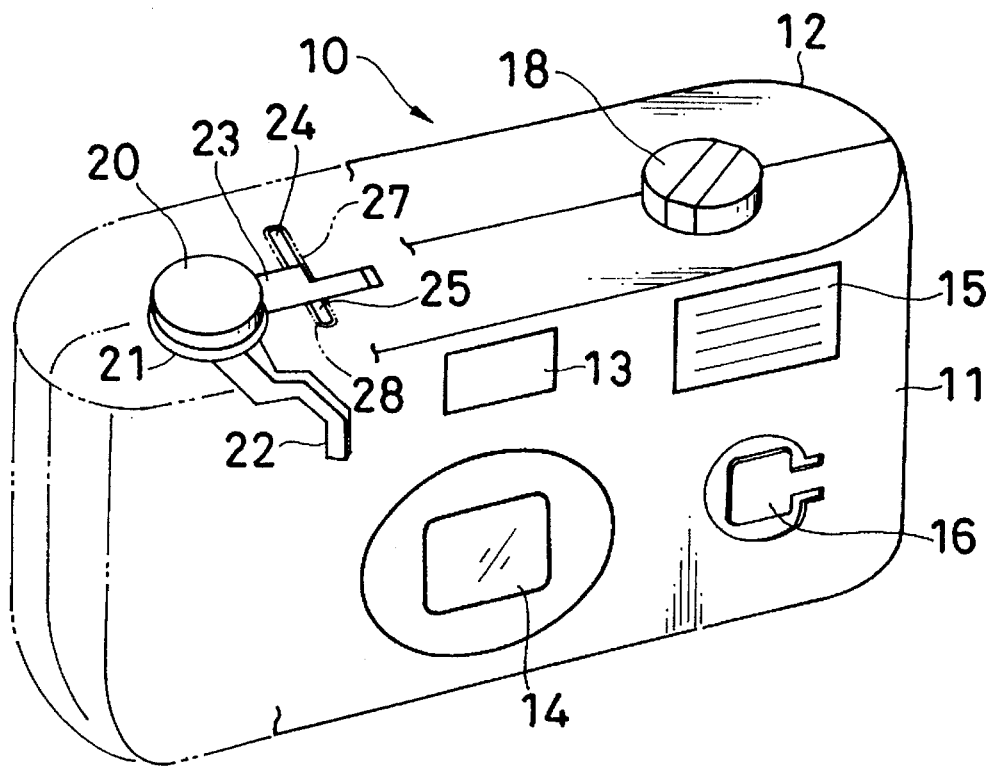
FIG. 1 is an oblique view showing a layout in a simplified camera in accordance with the first embodiment of the present invention.

FIG. 1 shows a layout in a film-replaceable simplified camera in accordance with the first embodiment. FIG. 2 shows a structure for mounting a photography button. In FIG. 1, a body case 10 is divided into a front case 11 and a back case 12. The front and back cases are joined together and secured using screws, whereby the body case 10 is constructed. The front case 11 has a viewfinder 13, a photography window 14, a flash lamp 15, a strobe charging button 16, and others. A film rewind knob 18 is located in the right-hand part of the top of the body case 10. The film rewind knob 18 is interlocked with a Patrone axis stowed in a Patrone chamber. After photography is completed, the film rewind knob 18 is used to rewind film into a Patrone.

A photography button 20 is located in the left-hand part of the top of the body case 10. The photography button 20 has, as shown in FIG. 2, a flange 21 for restraining the photography button 20 from protruding outward. An acting member 22 is extending from the bottom of the flange 21. Pivot axes 24 and 25 are formed in the vicinities of the center of a support 23 extending horizontally from the flange 21. Axis receptor holes 27 and 28 are, as shown in FIG. 2, bored in the inner surfaces of the front and back cases 11 and 12. A ring 29 for retraining the photography button 20 from popping out is mounted on the front case 11. An opening 30 is bored in the back case 12.

Figure 2A:
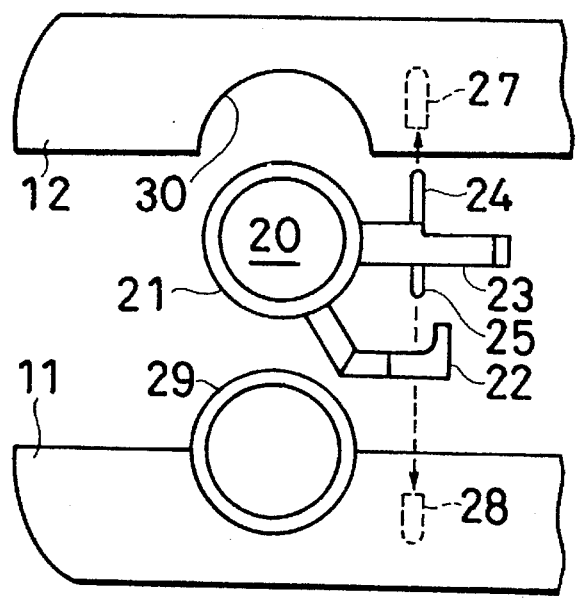
FIG. 2A is a top view showing a photography button in FIG. 1.
Figure 2B:
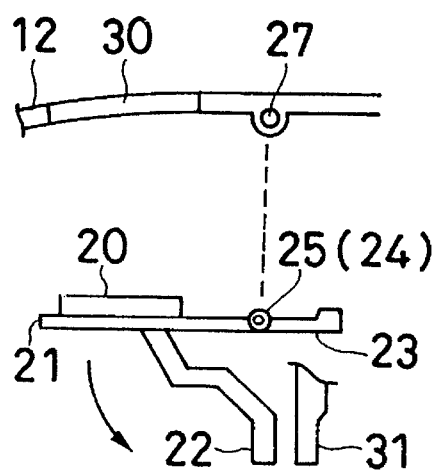
FIG. 2B is a front view showing the photography button and a back case in FIG. 1.

As mentioned above, the members are arranged in the state shown in FIG. 2A. The pivot axes 24 and 25 are fitted into the axis receptor holes 27 and 28, and the front and back cases 11 and 12 are joined together. Thus, the photography button is constructed. In this state, the photography button 20 can, as shown in FIG. 2B, pivot relative to the pivot axes 24 and 25. For example, when a locking lever 31 for immobilizing a shutter drive lever is positioned so that it is pushed by the acting member 22, the swing of the acting member 22 causes the drive lever charged with spring constraining force to move. Consequently, shutter operation is executed for a sector.

Figure 3:
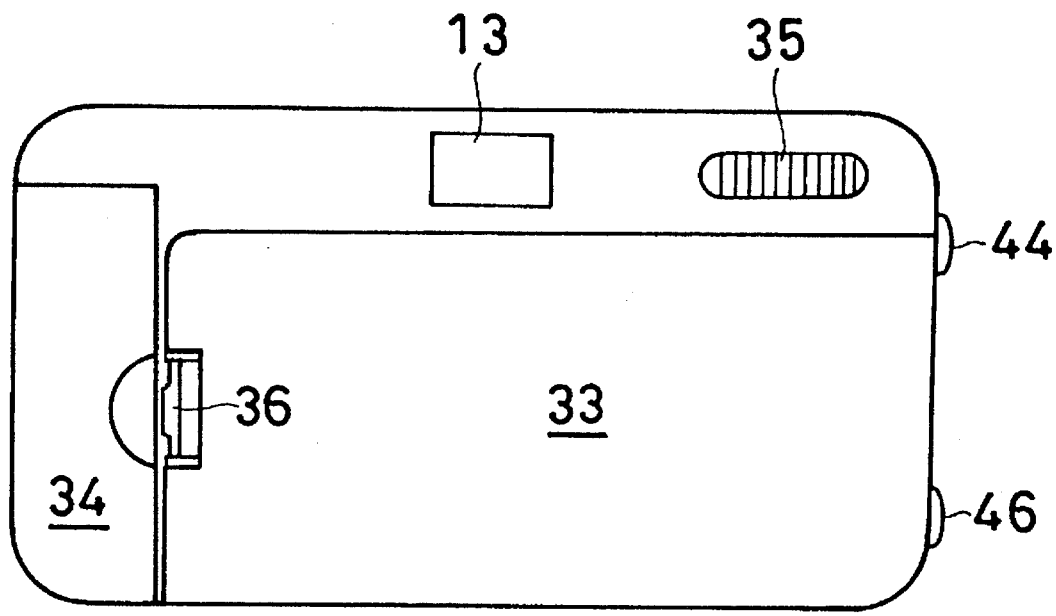
FIG. 3 shows a body case of the camera in accordance with the first embodiment viewed from behind the camera.
Figure 4:
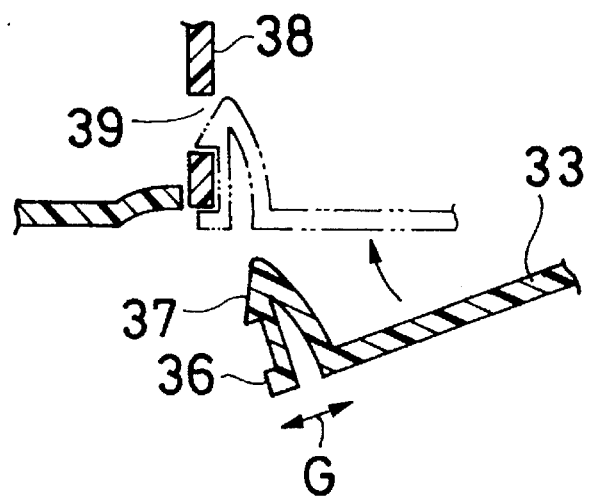
FIG. 4 is a sectional view showing a structure of a switch for opening or closing a back cover in the first embodiment.
Figure 5:
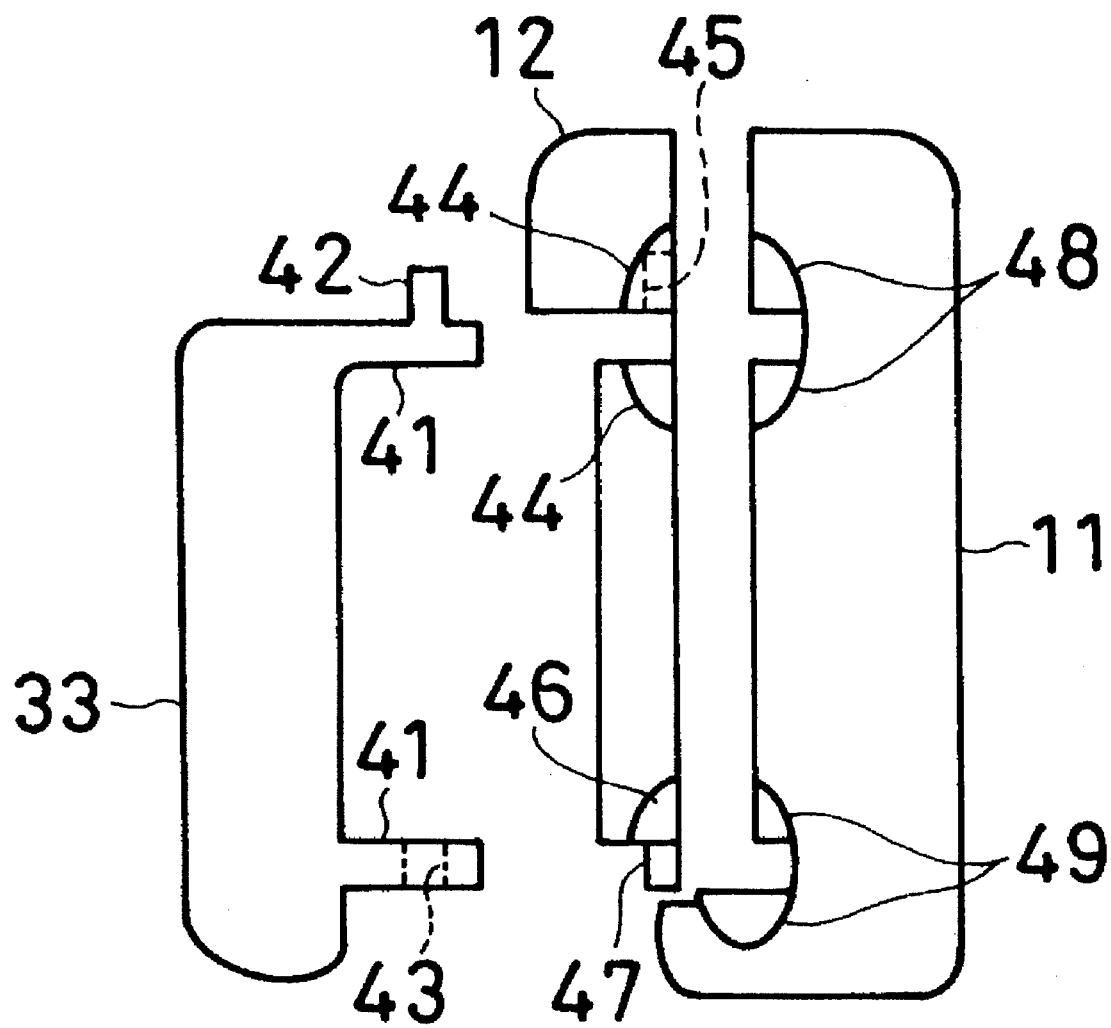
FIG. 5 is a side view showing a structure of a hinge for the back cover.

FIGS. 3 to 5 show a structure for mounting a back cover in this embodiment. In this embodiment, the back cover mounting structure is simplified in order to reduce cost. Specifically, FIG. 3 shows the back of a camera. As illustrated, a back cover 33 is attached. A battery stowage 34 is located in the left-hand part of the body case. A film wind knob 35 is mounted in the upper right-hand part of the body case. The back cover 33 has a switch member (elastic switch) 36 made of an elastic material. The switch member 36 is, as shown in FIG. 4, shaped like a letter V and can stretch and contract in the directions of arrows G. The switch member 36 has a claw 37 formed as part thereof. A partition 38 or a housing has a hole 39 into which the claw 37 is fitted.

FIG. 5 shows a hinge for the back cover 33. As illustrated, supports 41 that are parts of the back cover 33 have a pin axis 42 (on the upper support) and an axis receptor hole 43 (in the lower support) respectively. An axis receptor hole 45 is bored in an upper axis receptor 44 formed in the back case 12, and a pin axis 47 is formed on a lower axis receptor 46. Axis receptors 48 and 49 serving as presser members are formed in the front case 11. The pin axis 42 of the support 41 is fitted into the axis receptor hole 45 of the axis receptor 44, the pin axis 47 of the axis receptor 46 is fitted into the axis receptor hole 43 of the support 41, and then the front and back cases 11 and 12 are joined together. Thereby the back cover 33 is attached so that it can be opened or closed freely. Thus, this structure is advantageous in that the back cover 33 can be attached readily.

The back cover 33 is opened or closed using the elastic latch member 36 shown in FIG. 4. Using the latch member 36, when the back cover 33 is attached, the claw 37 is fitted into the hole 39 so that the back cover 33 is closed. By contrast, when the switch member 36 is contracted by holding an end thereof, the claw 37 is freed. Thus, the back cover 33 is opened. The aforesaid structures of mounting the back cover 33 and of opening or closing the back cover 33 can be produced effortlessly. Consequently, the body case 10 can be manufactured at low cost.

As described above, according to the first embodiment, a photography button can be constructed readily merely by fitting pivot axes into axis receptor holes and joining front and back cases together. In a film-replaceable simplified camera in which low-cost parts retrieved from a lens-mounted film are employed, a photography button can be mounted at low cost.

Second Embodiment

Figure 6:
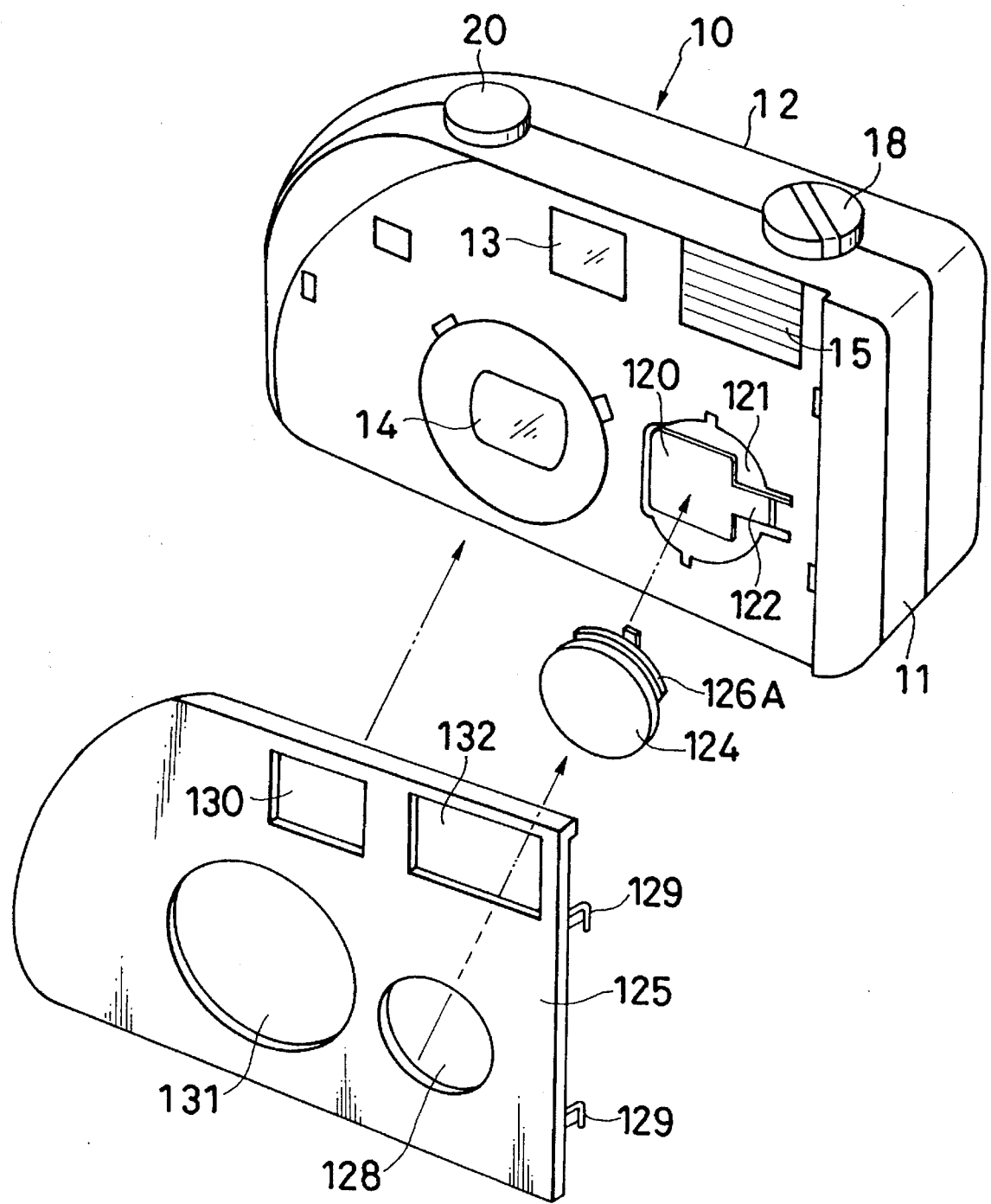
FIG. 6 is an exploded oblique view showing a configuration of a simplified camera in accordance with the second embodiment.

FIG. 6 shows a layout along the front surface of a film-replaceable simplified camera in accordance with the second embodiment. FIG. 7 is an enlarged view showing an acting member for executing charging. FIG. 8 shows a charging button in detail. As shown in FIG. 6, on a body case 10 divided into a front case 11 and a back case 12, a viewfinder 13, a photography window 14, a flash lamp 15, a photography button 16, and a film rewind knob 18 are mounted in the same manner as they are in the first embodiment.

Figure 11:
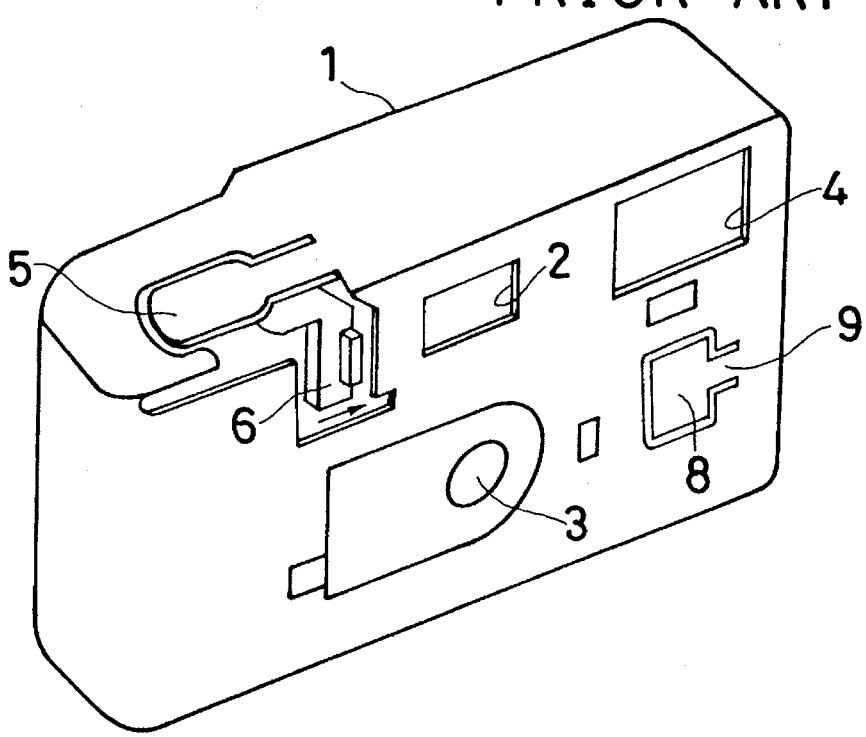
FIG. 11 is an oblique view showing a layout in a body case for a conventional lens-mounted film.

An acting member 120 for executing charging is located below the flash lamp 15 on the body case 10. The acting member 120 and its internal switch have the same structures as those in a conventional lens-mounted film (FIG. 11). Specifically, as seen in the enlarged view of FIG. 7, the acting member 120 is shaped so that it can be accommodated in an opening 121 of the front case 11, and integrated into the case 11 via a coupling 122. The acting member 120 nods with the proximal end of the coupling 122 as a supporting point. A metallic plate constituting a switch is incorporated in the acting member 120. When the acting member 120 is pressed, the metallic plate abuts on contacts constituting the switch.

A charging button 124 that is an action button for use in executing charging is positioned so that it abuts on the acting member 120 and is accommodated in the opening 121 (FIG. 7). A decorative plate 125 is attached to the front surface of the front case 11. As shown in the detailed view of FIG. 8, the charging button 124 has flanges 126A and 126B. The decorative plate 125 has an opening through which the charging button 124 can pass but the flanges 126A and 126B cannot pass. A plurality of locking claws 129 are projecting from the decorative plate 125. By means of the locking claws 129, the decorative plate 125 is secured to the front case 11. The decorative plate 125 has a viewfinder opening 130, a photography unit opening 131, and a flash lamp opening 132. The other units or holes in the front case 11 are blocked by the decorative plate 125.

As shown in FIG. 8B, the left-hand end of the charging button 124 is higher than the right-hand end thereof. That is to say, since the acting member 120 in this embodiment is structured to nod with the proximal end of the coupling 122 as a supporting point, the pivot may cause the charging button 124 to sink into the front case 11. For preventing the charging button 124 from sinking, the left-hand end of the charging button 124 away from the coupling 122 is made higher. Owing to this structure, when the charging button 124 is pressed, the top of the charging button 124 becomes parallel to the surface of the front case 11. It becomes therefore very easy to press the charging button 124.

According to the aforesaid layout, the charging button 124 is mounted readily merely by inserting it in the opening 121 and attaching the decorative plate 125 to the front case 11. The decorative plate 125 prevents the charging button 124 from coming off. When the charging button 124 is pressed, the acting member 120 pivots with the proximal end of the coupling 122 as a supporting point. This causes the metallic plate of the switch to abut on the contacts thereof. Thus, charging of a strobe capacitor is executed. According to this embodiment, a pivot type acting member and a charging switch retrieved from a lens-mounted film can be used as they are. Since the charging button 124 is structured independently, the charging button 124 may be colored or patterned freely.

FIGS. 9 and 10 show a glass window for a photographing lens. In this embodiment, a structure for mounting a photography window glass is designed simple in an effort to reduce cost. Specifically, FIGS. 9A and 9B show the back of the front case 11. As shown in FIG. 9A, partitions 135 are used to position a window glass 134. The partitions 135 are formed in a circular guide ditch 136 for guiding a glass presser that will be described later. Three fixtures 138 are formed along the circumference of the circular guide ditch 136. Each of the fixtures 138 has a horizontal ditch 139 as shown in FIG 9B.

Figures 10A, 10B:
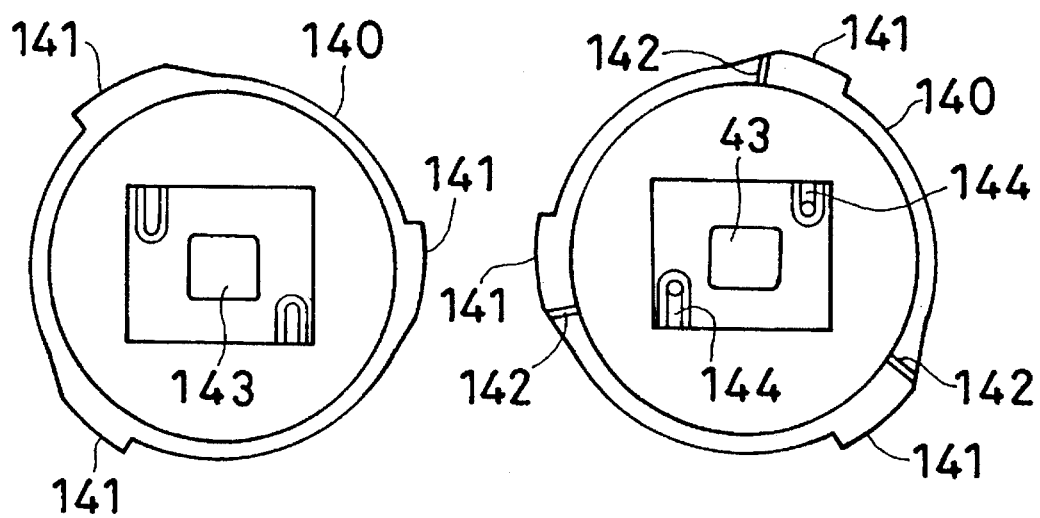
FIG. 10A shows a window glass presser viewed from behind it.
FIG. 10B is a top view showing the window glass presser.

FIGS. 10A and 10B show a structure of a glass presser. FIG. 10A shows the back of the glass presser, while FIG. 10B shows the front thereof. In FIGS. 10A and 10B, a circular plate type presser 140 has fitting projections 141 that are slided and fitted into the ditches 139 of the fixtures 138. A stopper 142 is attached to each of the fitting projections 141. Elastic members 144 for supporting the window glass 134 reliably are placed in the vicinities of an opening 143 bored in the center of the presser 140. When the presser 140 oriented as shown in FIG. 10A is placed over the circular guide ditch 136 in FIG. 9A in which the window glass 134 is placed, and then turned counterclockwise, the three fitting projections 141 are fitted into the ditches 139 of the fixtures 138. When the presser 140 is further turned until it is stopped by the stoppers 142, the window glass 134 is secured firmly by the presser 140. This structure is advantageous in that the window glass 134 for the photographing lens can be mounted readily.

As described above, according to the second embodiment, components of a lens-mounted film can be utilized and a separate charging button can be mounted readily.

What is claimed is:

1. A simplified camera, comprising:
   a support that supports a photography button with which an acting member for executing photography is integrated and that has pivot axes relative to which said photography button is pivoted;
   two cases made by dividing a camera case back and forth; that is, front and back cases that have axis receptor holes into which said pivot axes are fitted and that when joined together, hold said support in such a manner that said photography button can pivot;
   a back cover of a camera serving as part of said back case; and
   a mounting structure for mounting said back cover securely by uniting pin axes and axis receptor holes which are formed as parts of a side surface of said back cover and side surfaces of said front case and back case.

2. A simplified camera according to claim 1, wherein said photography button has a flange for restraining said photography button from protruding outward.

3. A simplified camera according to claim 1, wherein a latch member for opening or closing said back cover is a V-shaped elastic member formed as part of said back cover where the tip of the V-shape points towards said back case.

4. A simplified camera, comprising:
   an acting member formed on said front case in order to operate a charging switch;
   a charging button being positioned so that it pressures said acting member and having off-prevention members formed along the outer circumference thereof;
   a decorative plate having an opening that is large enough to expose said charging button to outside and to allow said decorative plate to cooperate with said off-prevention members in hindering said charging button from coming off; and
   wherein said acting member for operating said charging switch is of a pivot type and one end of said charging button away from a supporting point for nodding and near said acting member is higher than the other end thereof near said supporting point.

5. A simplified camera according to claim 4, further comprising:

partitions formed along the circumference of a photography window of said front case and used for positioning a window glass;

a presser for pressuring said window glass; and fixtures which are formed on said front case and into which fitting projections formed as parts of said glass presser are slid rotatively and fitted.

6. A simplified camera according to claim 4, further comprising:

a support that supports a photography button with which an acting member for executing photography is integrated and that has pivot axes relative to which said photography button is pivoted; and two cases made by dividing a camera case back and forth; that is, front and back cases that have axis receptor holes into which said pivot axes are fitted and that when joined together, hold said support in such a manner that said photography button can pivot.

\* \* \* \* \*